United States Patent
Miziolek et al.

(10) Patent No.: US 12,198,173 B2
(45) Date of Patent: Jan. 14, 2025

(54) TREATMENT SELECTION AND APPLICATION USING MACHINE LEARNING TO PREDICT COST OF TREATMENT WHERE INFORMATION ABOUT COST OF TREATMENT IS UNKNOWN

(71) Applicant: Maplebear Inc., San Francisco, CA (US)

(72) Inventors: Konrad Gustav Miziolek, San Francisco, CA (US); Bryan Daniel Bor, Pittsburg, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/731,608

(22) Filed: Apr. 28, 2022

(65) Prior Publication Data

US 2023/0351465 A1 Nov. 2, 2023

(51) Int. Cl.
*G06Q 30/00* (2023.01)
*G06N 20/20* (2019.01)
*G06Q 30/0201* (2023.01)
*G06Q 30/0601* (2023.01)

(52) U.S. Cl.
CPC ......... *G06Q 30/0617* (2013.01); *G06N 20/20* (2019.01); *G06Q 30/0206* (2013.01); *G06Q 30/0625* (2013.01)

(58) Field of Classification Search
CPC ........... G06Q 30/0617; G06Q 30/0206; G06Q 30/0625
See application file for complete search history.

(56) References Cited

U.S. PATENT DOCUMENTS

| | | | | |
|---|---|---|---|---|
| 2017/0193561 | A1* | 7/2017 | Shen | G06Q 30/0275 |
| 2021/0142387 | A1* | 5/2021 | Gupta | G06Q 30/0217 |
| 2022/0292999 | A1* | 9/2022 | Kratzer | G06N 20/00 |
| 2022/0366437 | A1* | 11/2022 | Li | G06N 3/08 |

FOREIGN PATENT DOCUMENTS

CN 110428244 A * 11/2019 ............. G06Q 20/18

OTHER PUBLICATIONS

Li, L., Chen, J., & Raghunathan, S. (2018). Recommender system rethink: Implications for an electronic marketplace with competing manufacturers. Information Systems Research, 29(4), 1003. doi:http://dx.doi.org/10.1287/isre.2017.0765 (Year: 2018).*

* cited by examiner

*Primary Examiner* — Raquel Alvarez
(74) *Attorney, Agent, or Firm* — Fenwick & West LLP (57) ABSTRACT

A user treatment engine uses user data describing characteristics of a user to evaluate a set of treatments that the user treatment engine may apply to the user. The user treatment engine generates treatment cost predictions for the treatments and generates treatment scores for the set of treatments based on the treatment cost predictions for the treatments and the user data for the user. The user treatment engine selects and applies a treatment from the set of treatments based on the generated treatment scores. The user treatment engine determines a reward to the online concierge system for the application of the treatment to the user and updates treatment selection parameters for the applied treatment based on the determined reward.

20 Claims, 6 Drawing Sheets

TREATMENT SELECTION AND APPLICATION USING MACHINE LEARNING TO PREDICT COST OF TREATMENT WHERE INFORMATION ABOUT COST OF TREATMENT IS UNKNOWN

BACKGROUND

Online systems, such as an online concierge system, often apply treatments to specific users to encourage those users to interact with the online system. For example, an online system may notify a user of new content that is available to the user or may provide incentives to a user if the user performs an interaction with the online system.

Online systems sometimes use machine learning models that are trained to select which treatment to apply to a particular user. However, these machine learning models often fail to balance exploration with exploitation, meaning the machine learning models can improperly balance using treatments that have more training data with treatments that have less training data. Specifically, machine learning models may over rely on treatments with known rewards. Thus, these machine learning models can provide less value to the online system by selecting suboptimal treatments to apply to a user.

Additionally, machine learning models may balance an estimated reward to the online system with the cost of a treatment. However, many machine learning models assume a static cost to the online system for each treatment, without considering possible uncertainty in the actual cost to the online system. Thus, machine learning models may undervalue treatments with higher maximum costs but with lower average costs.

SUMMARY

In accordance with one or more aspects of the disclosure, an online concierge system may use a user treatment engine to select treatments to apply to users. A treatment is an action that the online concierge system may take with regards to a user to encourage the user to interact with the online concierge system. The user treatment engine may use user data describing characteristics of a user to evaluate a set of treatments that the user treatment engine may apply to the user. The treatment cost for a treatment may be uncertain at the time the treatment is applied to the user because the actual treatment cost may be incurred at a time after the treatment is applied. The user treatment engine may generate treatment cost predictions for the treatments, where each treatment cost prediction is a prediction of the actual treatment cost to the online concierge system of applying the treatment to the user.

The user treatment engine may generate treatment scores for the set of treatments based on the treatment cost predictions for the treatments and the user data for the user. In some embodiments, to generate the treatment scores, the user treatment engine samples from probability distributions for the set of treatments. The user treatment engine may use treatment selection parameters to sample a probability distribution for a treatment to generate the treatment score for the treatment. For example, the treatment selection parameters for a treatment may include a mean and standard deviation for a normal distribution, and the user treatment engine may sample the normal distribution to generate a treatment score for the treatment. The user treatment engine may adjust the treatment score for a treatment based on the user data or the treatment cost prediction for the treatment. The user treatment engine may select a treatment from the set of treatments to apply to the user based on the generated treatment scores.

The user treatment engine may apply the selected treatment to the user and determine a reward to the online concierge system for the application of the treatment to the user. For example, the user treatment engine may determine an increase in user interactions with the online concierge system based on the applied treatment. The user treatment engine may determine the reward based on treatment application data describing the application of the treatment to the user. The user treatment engine may update the treatment selection parameters for the applied treatment based on the determined reward. For example, where the treatment selection parameters are used as parameters of a probability distribution, the user treatment engine may use the determined reward as a new sample to update the parameters of the probability distribution.

DETAILED DESCRIPTION

Environment of an Online Concierge System

Figure 1:
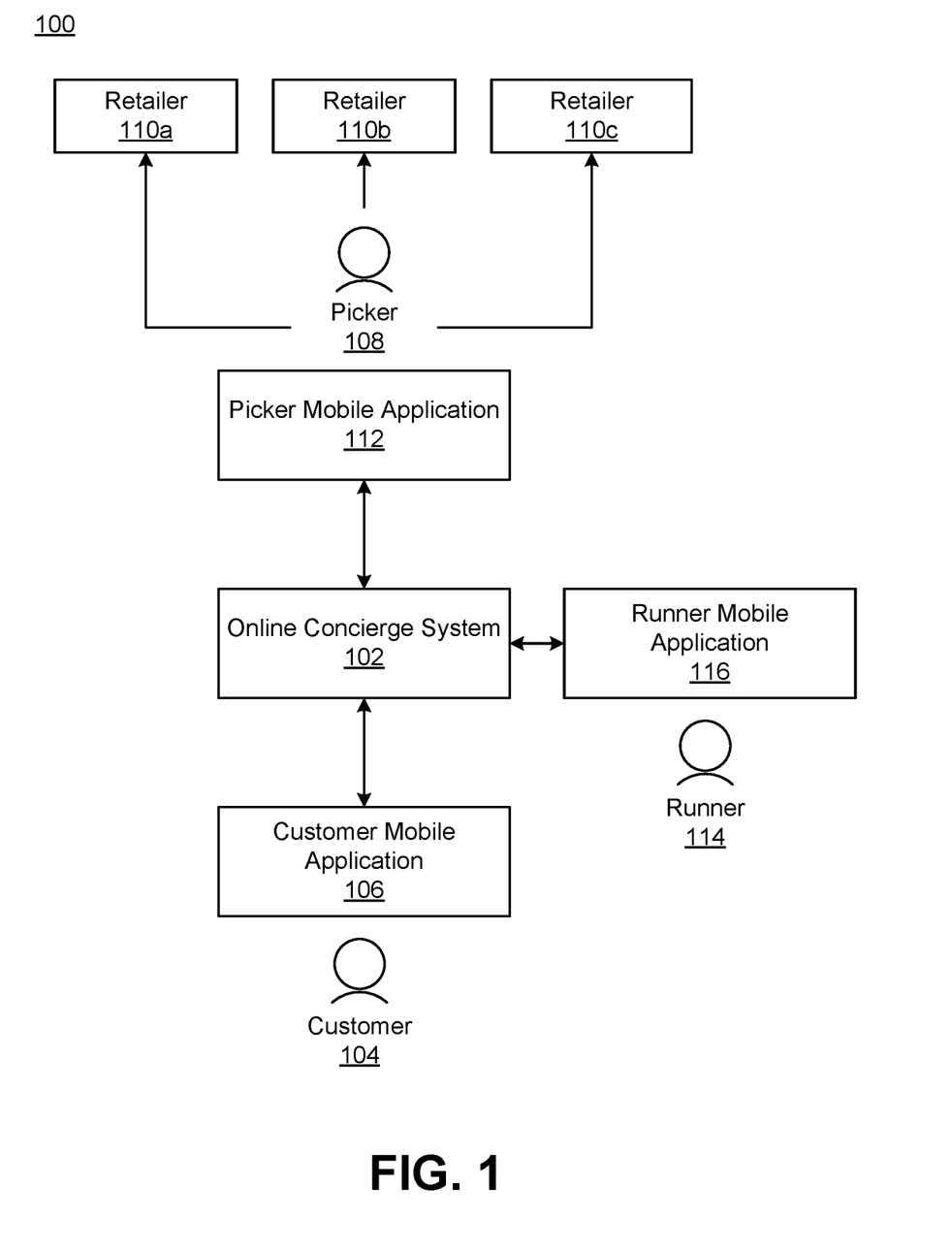
FIG. 1 illustrates the environment of an online concierge system, in accordance with one or more illustrative embodiments.

FIG. 1 illustrates an example system environment 100 of an online concierge system 102, according to some embodiments. The system environment 100 illustrated in FIG. 1 includes an online concierge system 120, a customer 104, a customer mobile application 106, a picker 108, one or more retailers 110, a picker mobile application 112, a runner 114 and a runner mobile application 116. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Additionally, the figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods or products to be delivered to the customer 104. Goods, items, and products may be used synonymously herein to mean any item that a customer 104 can purchase via the online concierge system. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include any number of retailers). The retailers 110 may be physical retailers, such as grocery stores, discount stores, department stores, etc., or non-public warehouses storing items that can be collected and delivered to customers. Each picker 108 fulfills an order received from the online concierge system 102 at one or more retailers 110, delivers the order to the customer 104, or performs both fulfillment and delivery. In some embodiments, pickers 108 make use of a picker mobile application 112 which is configured to interact with the online concierge system 102. In some embodiments, a picker 108 may also be a runner 114 or vice versa.

Online Concierge System

Figure 2:
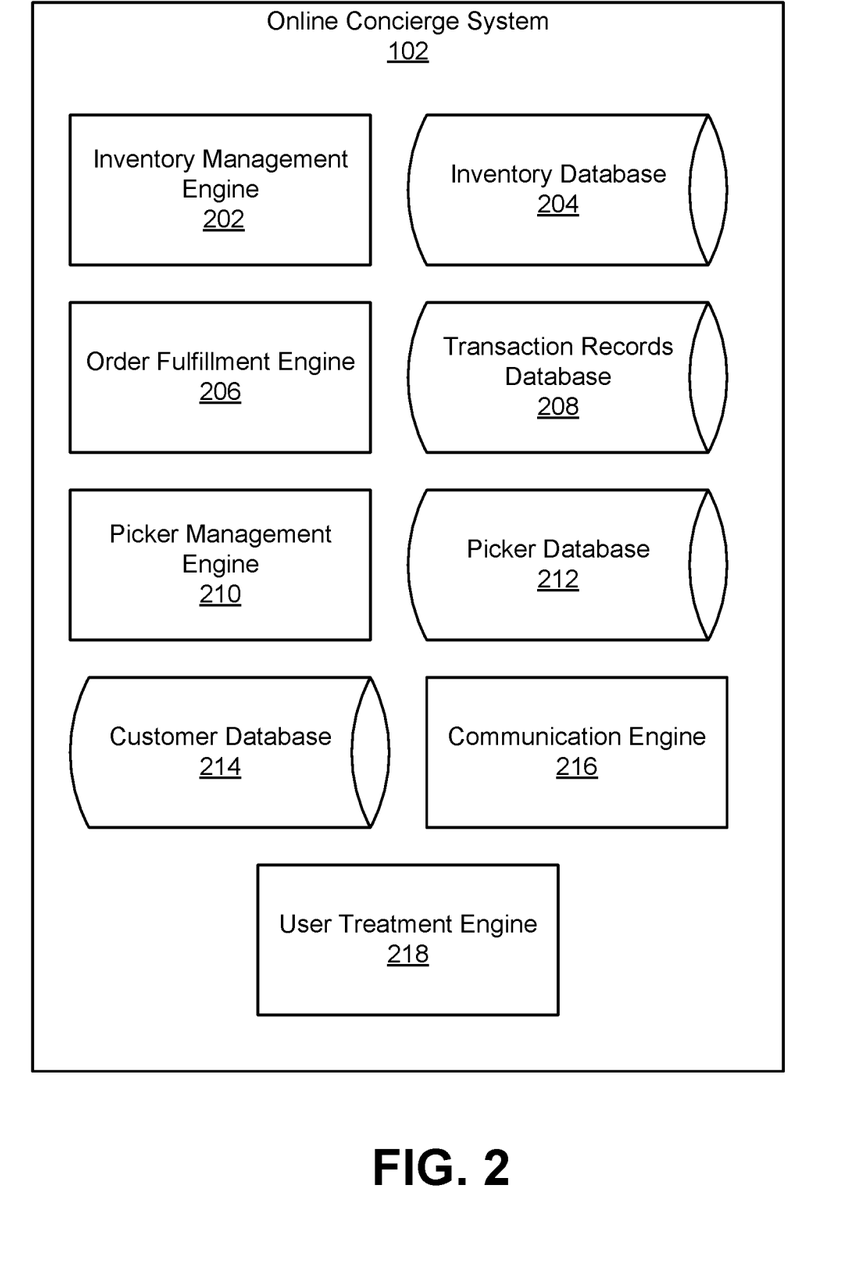
FIG. 2 is a block diagram of an online concierge system, in accordance with one or more illustrative embodiments.

FIG. 2 is a block diagram of an online concierge system 102, according to some embodiments. The online concierge system illustrated in FIG. 2 includes an inventory management engine 202, an inventory database 204, an order fulfillment engine 206, a transaction records database 208, a picker management engine 210, a picker database 212, a customer database 214, a communications engine 216, and a user treatment engine 218. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The online concierge system 102 includes an inventory management engine 202, which interacts with inventory systems associated with each retailer 110. In some embodiments, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and quantitative information about items, including size, color, weight, SKU, serial number, and so on. In some embodiments, the inventory database 204 also stores purchasing rules associated with each item, if they exist. For example, age-restricted items such as alcohol and tobacco are flagged accordingly in the inventory database 204.

In some embodiments, the inventory database 204 stores product embeddings for products offered for sale on the online concierge system 102. A product embedding is an embedding that describes a product. The product embeddings may be associated with specific products stored by the inventory database 204. For example, each brand of a product may have an individual product embedding, or products may have different product embeddings for each retailer that sells the product. Alternatively, each product embedding may be associated with a generic product, and each generic product is associated with specific products that are similar or substitutes of each other. For example, the inventory database 102 may store a product embedding for the generic product "milk", and the specific products of "Moo Moo 2% Milk" and "Greener Pastures Organic Whole Milk" may both be associated with the product embedding for "milk."

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retailers). The order fulfillment engine 206 also facilitates transactions associated with each order. In some embodiments, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and customer 104 associated with the transaction. In some embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In some embodiments, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

The online concierge system 102 may use a communication engine 216 that transmits information between the customer mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a customer in transit, issues with items in an order, and the like. The communication engine 216 determines a message or notification to send to a customer 104, picker 108, or runner 114 based on this information and transmits the notifications to the appropriate application. For example, the online concierge system 102 may receive information from the customer mobile application 106 indicating that a customer 104 is traveling to the pickup location to retrieve an order. Based on this information, the communication engine 216 sends a notification to the runner mobile application 116 indicating that the customer 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the customer mobile application 106 associated with the order.

The user treatment engine 218 selects treatments to apply to users based on user data describing those users. The user treatment engine 218 may predict the costs of treatments that may be applied to users by applying a treatment cost model to the user data for the users. Additionally, the user treatment engine 218 may generate treatment scores for treatments based on probability distributions associated with the treatments. The user treatment engine 218 may use treatment selection parameters to adjust the probability distributions for treatments to estimate the expected reward to the online concierge system 102 for applying a treatment to a user. The user treatment engine 218 is described in further detail below with regards to FIG. 4.

Figure 3A:
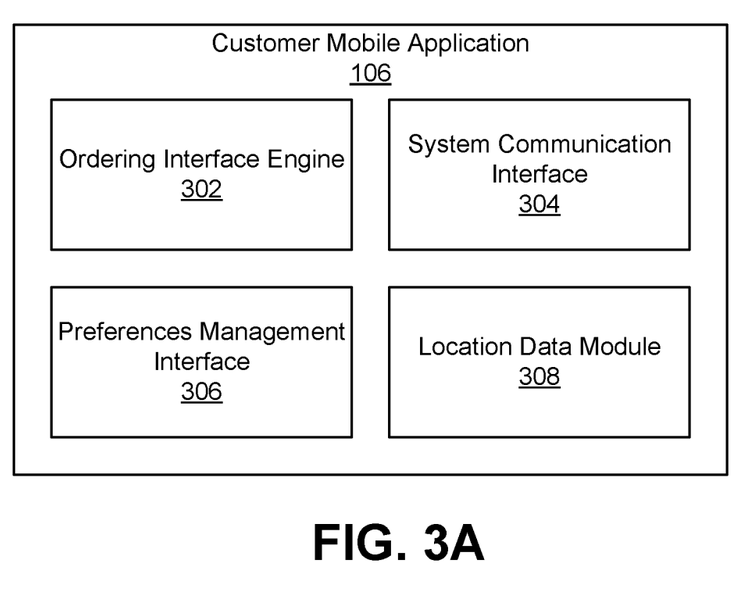
FIG. 3A is a block diagram of the customer mobile application (CMA), in accordance with one or more illustrative embodiments.

FIG. 3A is a block diagram of the customer mobile application (CMA) 106, according to some embodiments. The CMA 106 illustrated in FIG. 3A includes an ordering interface engine 302, a system communication interface 304, a preferences management interface 306, and a location data module 308. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The customer 104 accesses the CMA 106 via a client device, such as a mobile phone, tablet, laptop, or desktop computer. The CMA 106 may be accessed through an app running on the client device or through a web site accessed in a browser. The CMA 106 includes an ordering interface 302, which provides an interactive interface with which the customer 104 can browse through and select products and place an order. The ordering interface 302 also may include a selected products list that specifies the amounts and prices of products that the customer 104 has selected to order. The customer 104 may review the selected products list and place an order based on the selected products list. Furthermore, the ordering interface 302 may present recipes to the customer 104 that the online concierge system 102 predicts the customer 104 is attempting to complete, and may provide an option to the customer 104 to add additional products needed to complete a recipe to the customer's selected products list.

Customers 104 may also use the ordering interface 302 to message with pickers 108 and runners 114 and receive notifications regarding the status of their orders. The CMA 106 also includes a system communication interface 304 which, among other functions, receives inventory information from the online concierge system 102 and transmits order and location information to the online concierge system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred retailers 110, preferred handoff times, special instructions for handoff, and so on.

The CMA 106 also includes a location data module 308. The location data module 308 may access and store location data related to a client device associated with a customer 104 via the customer mobile application 106. Location data may include the geographic location of the client device associated with the customer mobile application 106, how fast the client device is travelling, the average speed of the client device when in transit, the direction of travel of the client device, the route the customer 104 is taking to a pickup location, current traffic data near the pickup location, and the like. For simplicity, the location of a customer client device or client device may be referred to as the location of the customer throughout this description. The customer 104 may specify whether or not the share this location data with the customer mobile application 106 via the preferences management interface 306. If a customer 104 does not allow the customer mobile application 106 to access their location data, the location data module 308 may not access any location data for the customer 104. In some embodiments, the customer 104 may specify certain scenarios when the location data module 308 may receive location data, such as when the customer 104 is using the customer mobile application 106, any time, or when the customer 104 turns on location tracking in the customer mobile application 106 via an icon. The customer 104 may also specify which location data the location data module 308 may retrieve, and which location data is off-limits. In some embodiments, the location data module 308 may be tracking the customer's 104 location as a background process while the CMA 106 is in use. In other embodiments, the CMA 106 may use real-time location data from the location data module 308 to display a map to the customer 104 indicating their current location and the route to a pickup location for their order.

Figure 3B:
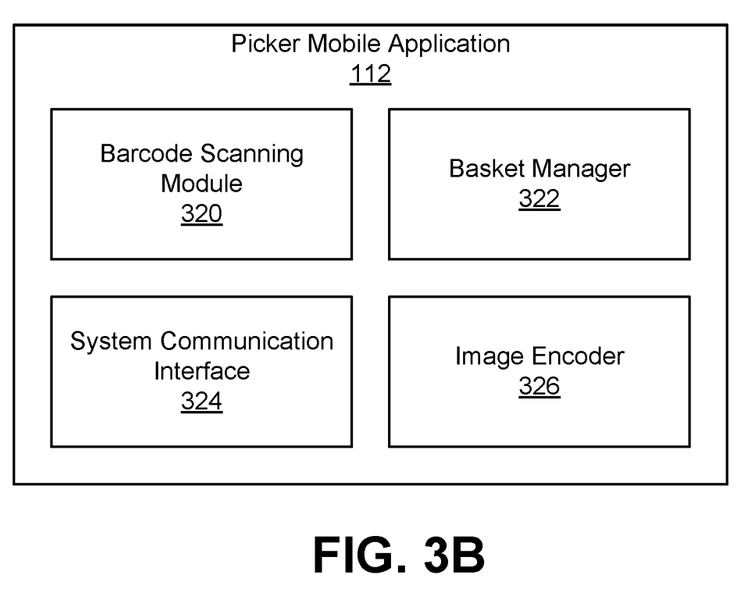
FIG. 3B is a block diagram of the picker mobile application (PMA), in accordance with one or more illustrative embodiments.

FIG. 3B is a block diagram of the picker mobile application (PMA) 112, according to some embodiments. The PMA 112 illustrated in FIG. 3B includes a barcode scanning module 320, a basket manager 322, a system communication interface 324, and an image encoder 326. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In some embodiments, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer updates an order to include more or less items. The system communication interface may receive notifications and messages from the online concierge system 102 indicating information about an order. The system communication interface transmits notifications and messages to be displayed via a user interface of the mobile device associated with the PMA 112.

Figure 3C:
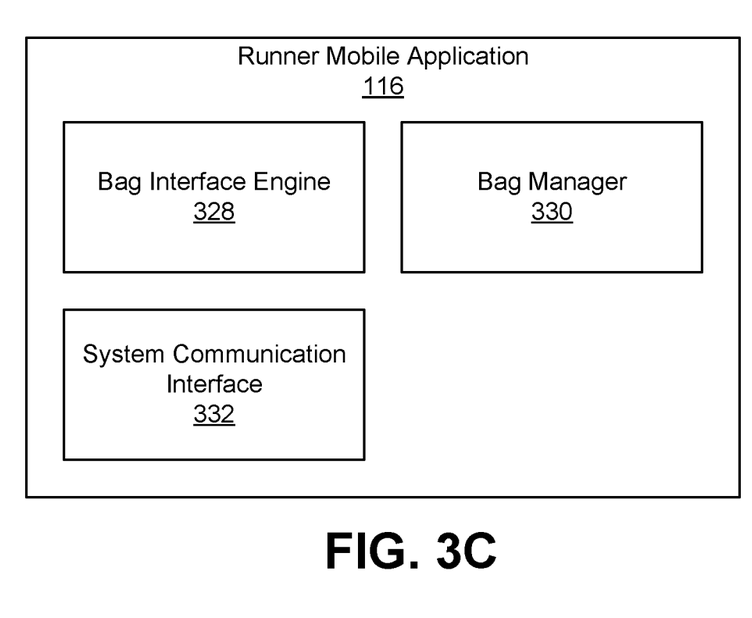
FIG. 3C is a block diagram of the runner mobile application (RMA), in accordance with one or more illustrative embodiments.

FIG. 3C is a block diagram of the runner mobile application (RMA) 116, according to some embodiments. The RMA 116 illustrated in FIG. 3C includes a bag interface engine 328, a bag manager 330, and a system communication interface 332. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a customer 104 who is in transit to a pickup location, and new orders to deliver. The runner 114 may also receive communications via the bag interface engine 328 with customers regarding order handoff and pickup confirmation and may interact with the interface generated by the bag interface engine 328 to send communications to customers and the online concierge system 102 regarding order status. For example, a runner 114 may send the customer a pickup spot at the pickup location to meet for order handoff and indicate that an order has been delivered to a customer via the interface, which ends the wait time calculation by the location data module 308 associated with the customer.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile device associated with the RMA 116.

Example User Treatment Engine

Figure 4:
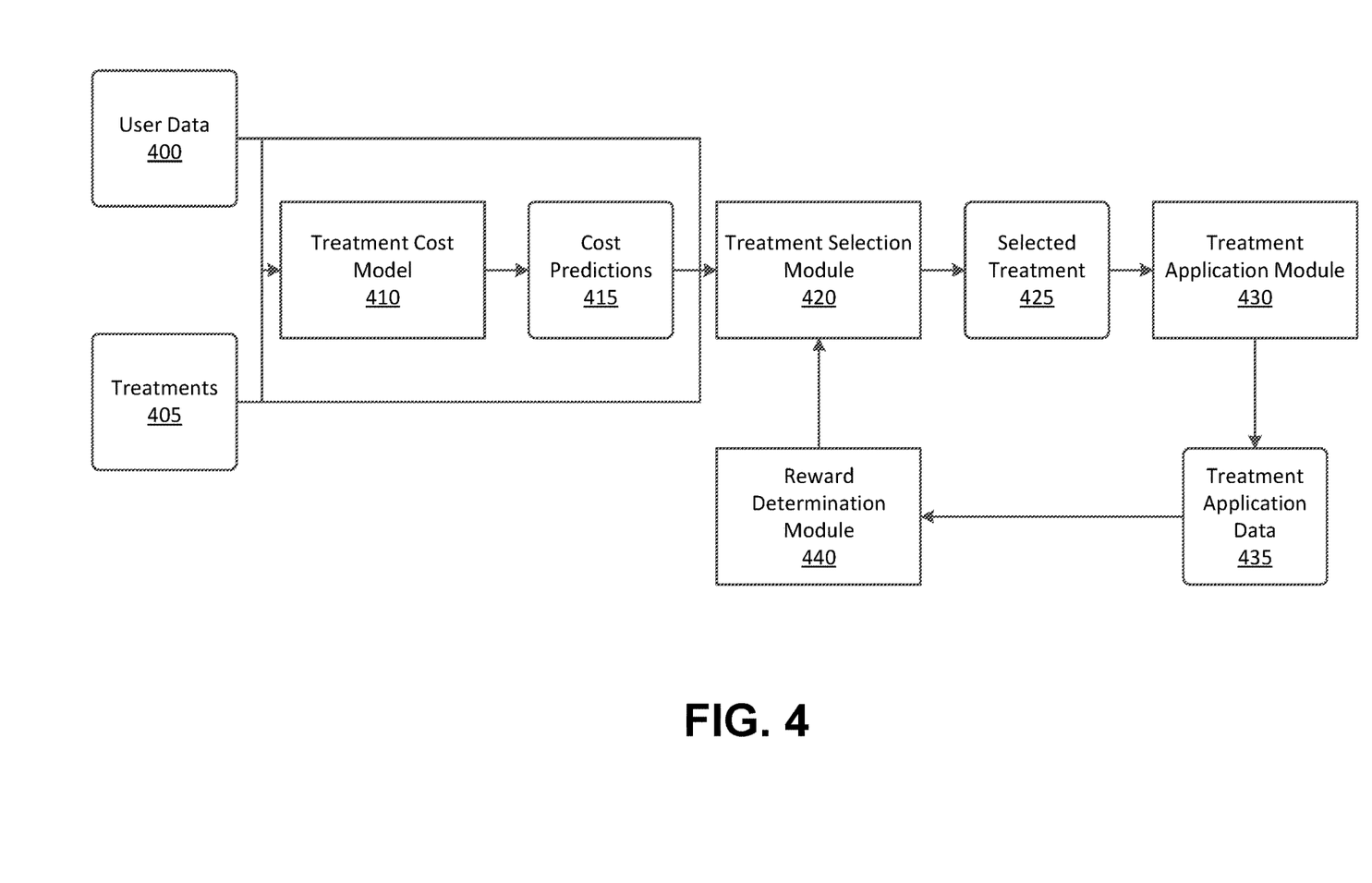
FIG. 4 illustrates data flow through an example user treatment engine, in accordance with one or more illustrative embodiments.

FIG. 4 illustrates data flow through an example user treatment engine, in accordance with some embodiments. Alternative embodiments may include more, fewer, or different components from those illustrated in FIG. 4 and the functionality of each component may be divided between the components differently from the description herein. Additionally, the functionality of each component may be performed automatically without human instruction or intervention. Furthermore, the user treatment engine illustrated in FIG. 4 may include some or all of the functionality or structure of the user treatment engine 218 illustrated in FIG. 2. Additionally or alternatively, the user treatment engine illustrated in FIG. 4 may be stored on and/or executed on one or more computing devices, such as online concierge system 102.

The user treatment engine receives user data 400 describing characteristics of a user. A user may be a customer, a picker, or a runner. The user data 400 may describe a user's interactions with the online concierge system, such as when the user has interacted with the online concierge system, what kinds of interactions the user has with the online concierge system, how often the user interacts with the online concierge system, or characteristics of the user's interactions with the online concierge system. Additionally, the user data 400 may describe demographic or personal information about the user, such as the user's name, age, gender, sex, income, contact information, location, or residence. In some embodiments, the user treatment engine receives user data 400 from a customer database 214, a picker database 212, an inventory database 204, or a transaction records database 208 of the online concierge system.

The user treatment engine also receives a set of treatments 405 that it may apply to a user. A treatment 405 is an action that the online concierge system may take with regards to a user to encourage the user to interact with the online concierge system. For example, for a customer user, a treatment 405 may include notifying the user of a new product, sending a message to the user encouraging the user to submit an order, sending a coupon to the user, offering the user a temporary or permanent discount on orders, offering the user a free product, or offering to reduce or eliminate fees on a user's purchase. For a picker user or a runner user, a treatment 405 may include notifying the user of a possible order for servicing, offering the user an additional service fee for servicing an order from another user, offering a temporary or permanent increase in a service fee or commission paid to the user for servicing orders, or offering a reward to the user for servicing a certain number of orders within a time period. A treatment 405 may further include an encouraged interaction for the user to perform. An encouraged interaction is an interaction that is targeted by the online concierge system for the user to perform. For example, an encouraged interaction may be for a user to place an order with the online concierge system or to service an order for the online concierge system.

Each treatment 405 may be associated with treatment data describing the treatment. The treatment data may describe treatment parameters for the application of the treatment. For example, treatment parameters for a treatment 405 may include timeframes when a treatment should be applied, characteristics of users to whom the treatment 405 should be applied, a value of consideration to provide to a user or a percentage for a discount to apply to a user's order. The treatment data may also include a treatment type for each treatment 405. For example, the treatment type may indicate whether the treatment 405 includes a discount, a coupon, a notification, or consideration to provide to the user. In some embodiments, the set of treatments 405 includes multiple treatments 405 with the same treatment type but different treatment parameters. For example, the set of treatments 405 may include multiple discount offers, where each discount offer has a different discount percentage.

Each treatment 405 may be associated with a cost to the online concierge system for applying the treatment 405 to a user. For example, a treatment cost may include consideration that the online concierge system provides to a user to encourage the user to interact with the online concierge system (e.g., a discount on a product to a customer or an additional service to a picker or runner). A treatment cost also may include an opportunity cost for the online concierge system representing the lost reward to the online concierge system by applying one treatment to a user rather than a different treatment 405. Furthermore, a treatment cost may be based on a limited number of times the online concierge system may apply a particular treatment 405 to any user or a limited number of times that the online concierge system may apply a treatment 405 to a particular user. For example, the online concierge system may limit the number of notifications that it provides to a user to avoid over-loading the user with too many notifications. Similarly, the online concierge system may limit the number of discounts or increased service fees that applies to users based on constraints provided by third parties to the online concierge system. Additionally, a treatment cost may be based on computer resources that are used to apply a treatment 405. For example, a treatment cost may be based on processing resources, networking resources, or memory resources used by the application of a treatment 405.

The cost of applying a treatment 405 to a user may not be certain at the time that the treatment is applied to the user. In some embodiments, the online concierge system may be uncertain as to whether a treatment cost will be incurred at all by applying a treatment 405 to a user. For example, the online concierge system may provide the benefit of a treatment 405 to user on the condition that the user perform the encouraged treatment with the online concierge system. Thus, the online concierge system may be uncertain at the time of applying the treatment 405 to the user whether the user will perform the encouraged interaction, and therefore may be uncertain whether the online concierge system will incur a treatment cost. For example, the online concierge system may offer an increased service fee to a picker user only if the picker user services a particular number of orders for customer users within a time period. The online concierge system may be uncertain whether the user will perform the required number of orders within the time period, and thus may be uncertain whether it will incur the cost of providing the user with the increased service fee.

Similarly, the online concierge system may be uncertain as to the magnitude of a treatment cost at the time of applying the treatment 405. For example, the online concierge system may offer an increased commission percentage to a picker user if the picker user services an order within a time period. The online concierge may be uncertain as to the size of an order to be assigned to the picker user, and thus may be uncertain as to the size of the commission that the online concierge system will provide to the user if the user services an order within the time period.

The user treatment engine applies a treatment cost model 410 to the user data 400 and the treatments 405 to generate treatment cost predictions 415 for the treatments 405. The treatment cost model 410 is a machine learning model (e.g., a neural network) that is trained to generate treatment cost predictions 415 based on user data 400 for a user and a set of treatments 405 whose treatment cost the treatment cost model 410 predicts. A treatment cost prediction 415 is a prediction of an actual treatment cost of applying a treatment to a user. For example, a treatment cost prediction 415 may be an expected total value of the treatment cost to the online concierge system. The treatment cost prediction 415 may be based on a minimum or maximum magnitude of a treatment cost, an average treatment cost for a type of treatment, or a likelihood that a cost will be incurred.

The treatment cost model 410 may be trained based on a set of training examples of treatments applied to users and labels representing actual costs of treatments. For example, each training example may include user data for a user of the online concierge system to whom a treatment was applied and treatment data describing the treatment that was applied to the user. To train the treatment cost model 410, the treatment cost model 410 may predict an actual treatment cost based on the user data and the treatment data in the training example, and the treatment cost model's prediction may be compared to the actual cost of the treatment indicated by the label for the training example. The treatment cost model 410 is then updated based on the predicted treatment cost and the actual treatment cost. In some embodiments, the treatment cost model 410 is updated based on a loss function that scores the performance of the treatment cost model 410. The treatment cost model 410 may be updated based on the loss function through a back-propagation process. In some embodiments, the treatment cost model 410 includes a machine-learned model for each treatment, where each machine-learned model is trained to predict costs for a particular treatment.

The treatment selection module 420 selects a treatment to apply to the user. To select a treatment, the treatment selection module 420 generates a treatment score for each treatment. A treatment score is a score that reflects an expected reward to the online concierge system if the associated treatment is applied to the user. To encourage the exploration of less-selected treatments, the treatment selection module 420 may use a probability distribution (e.g., a normal distribution or a beta distribution) associated with each treatment to generate a treatment score for each treatment. The treatment selection module 420 may adjust the treatment scores based on the user data 400 describing the user to reflect how each treatment may be more effective for certain users over other users. Additionally, the treatment selection module 420 may adjust the treatment scores based on the treatment cost predictions 415 associated with each treatment such that the treatment scores reflect their likely respective costs to the online concierge system for application to the user. The treatment selection module 420 may select which treatment to apply to the user based on the treatment scores for each treatment 405. In some embodiments, the treatment selection module 420 uses a multi-arm bandit algorithm to select the treatment to apply to the user. For example, the treatment selection module 420 may use Thompson sampling to select a treatment.

The treatment selection module 420 may use treatment selection parameters associated with each treatment to select a treatment. Treatment selection parameters are parameters that the treatment selection module 420 uses for the generation of the treatment scores for the treatments 405. For example, treatment selection parameters for a treatment may include parameters for a probability distribution that is used to generate the treatment score. The treatment selection parameters also may include adjustments that may be made to the generated treatment scores to encourage the selection of treatments with more certain rewards or to encourage the selection of treatments with less certain, but potentially higher rewards. For example, to increase the likelihood that an under-selected treatment is selected, the treatment selection module 420 may increase a weight applied to the treatment score for the under-selected treatment.

In some embodiments, the treatment selection parameters include weights that are used by a machine learning model (e.g., a neural network) that is trained to generate treatments scores for treatments based on user data 400 for a user and treatment cost predictions for the treatments. For example, the user treatment engine may access a set of training examples. Each training example may include user data 400 for a user who was treated and treatment cost predictions for treatments to apply to the user. Each training example may further include a label indicating a ground-truth treatment score for each treatment. The user treatment engine may apply a backpropagation process to update weights used by a machine-learning model to generate a final set of weights for the machine-learning model to use when being applied to user data 400 and treatment cost predictions.

The treatment selection module 420 may update the treatment selection parameters based on a reward to the online concierge system of applying the selected treatment 425 to the user. For example, if the treatment selection module 420 uses the treatment selection parameters as parameters for probability distributions for the scoring of treatments, the treatment selection module 420 may treat the reward as a sample of the probability distribution associated with the selected treatment 425 and may update the treatment selection parameters for the probability distribution based on the value of the reward. In some embodiments, the treatment selection module 420 updates the treatment selection parameters based on a reward determined by the reward determination module 440.

The treatment application module 430 applies the selected treatment 425 to the user. The treatment application module 430 may apply the selected treatment 425 to the user by transmitting instructions to a user device associated with the user to display a message associated with the treatment. For example, the treatment application module 430 may transmit instructions to a picker device associated with a picker user instructing the picker device to display and offer an increased service fee to the picker user if the picker user services at least a threshold number of orders within a certain time period.

The treatment application module 430 also may collect treatment application data 435 describing characteristics of the application of the treatment to the user. For example, the treatment application data 435 may describe the user's interactions with the online concierge system after the selected treatment 425 is applied to the user. For example, if the treatment applied to a customer gives the customer user a discount on an order, the treatment application data 435 may describe whether the user placed an order with the online concierge system using the provided discount and how the customer user's order compares with an ordinary order placed by the customer user. The treatment application module 430 also may collect treatment application data 435 describing a size of the user's order, the number of orders placed or serviced by the user, how long after the application of the treatment to the user performed the intended interaction, and whether the user continued interacting with the online concierge system after performing an encouraged interaction.

The reward determination module 440 determines a reward to the online concierge system of the application of the selected treatment 425 to the user. The treatment reward determined by the reward determination module 430 may be a gross value received by the online concierge system based on the selected treatment 425. For example, the online concierge system may determine a gross amount of consideration that the online concierge system received based on the user performing an encouraged interaction associated with the selected treatment 425. In some embodiments, the reward determination module 440 determines net reward received by the online concierge system in response to applying the treatment to the user. For example, the reward determination module 440 may determine a net change in the user's behavior after the treatment, and may determine the reward to the online concierge system based on the net change in the user's behavior. In some embodiments, the reward determined by the reward determination module is an uplift in the user's interaction with the online concierge system. The reward determination module 440 may provide the determined reward to the treatment selection module 420 to update treatment selection parameters for the selection of treatments.

By improving the process by which an online concierge system selects a treatment to apply to a user, the user treatment engine may expedite how long it takes the online concierge system to collect sufficient training data for different treatments. Thus, the user treatment engine may reduce the overall computational resources required to generate an effective system by which the online concierge system selects treatments for users.

Figure 5:
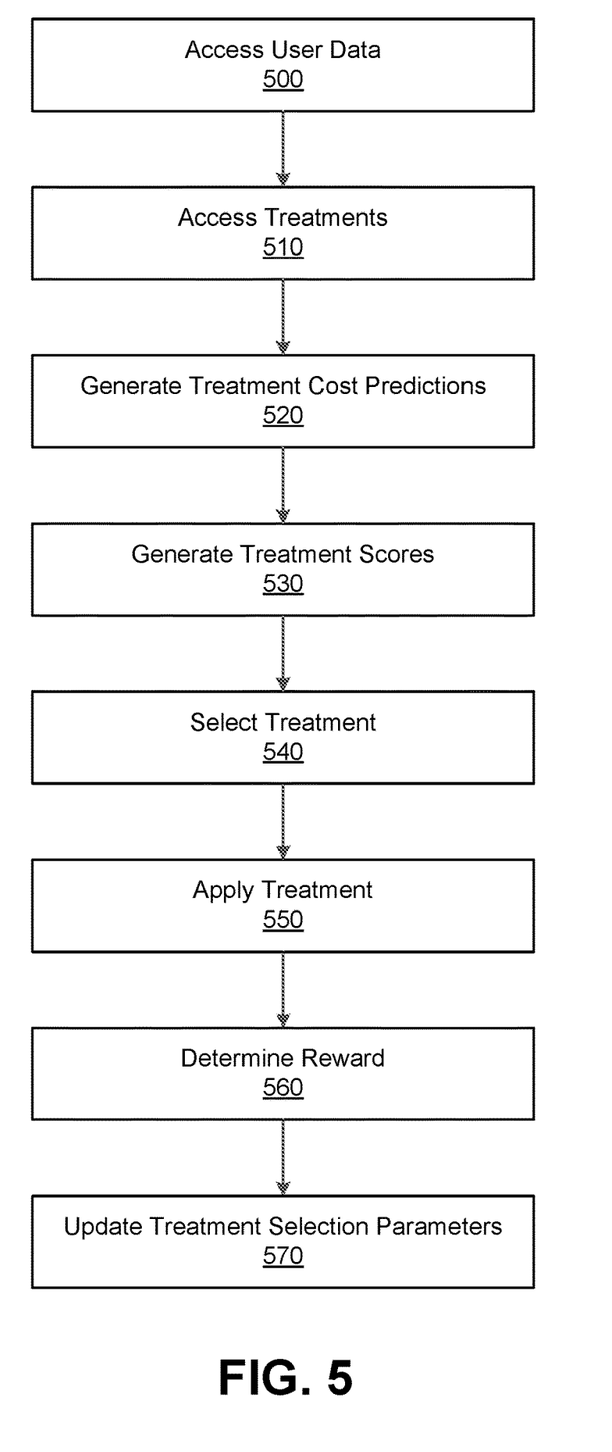
FIG. 5 is a flowchart illustrating an example method for selecting a treatment to apply to a user, in accordance with one or more illustrative embodiments.

FIG. 5 is a flowchart illustrating an example method for selecting a treatment to apply to a user, in accordance with some embodiments. Alternative embodiments may include more, fewer, or different steps from those illustrated in FIG. 5 and may perform the steps in a different order from that illustrated in FIG. 5. The method illustrated by FIG. 5 may be performed by a user treatment engine of an online concierge system, such as the user treatment engine 218 illustrated in FIG. 2.

A user treatment engine accesses 500 user data describing characteristics of a user. The user treatment engine accesses 510 a set of treatments that the user treatment engine may apply to the user. Each treatment may be associated with treatment data describing the treatment and a treatment cost.

The treatment cost for a treatment may be uncertain at the time the treatment is applied to the user because the actual treatment cost may be incurred at a time after the treatment is applied. The user treatment engine generates 520 treatment cost predictions for the treatments. Each treatment cost prediction is a prediction of the actual treatment cost (e.g., monetary or computational costs) to the online concierge system of applying the treatment to the user. The user treatment engine may generate the treatment cost predictions by applying treatment cost models to the user data. The treatment cost models may be trained based on training examples that include user data from previous applications of treatments to users and that are labeled to indicate an actual cost to the online concierge system.

The user treatment engine generates 530 treatment scores for the set of treatments based on the treatment cost predictions for the treatments and the user data for the user. In some embodiments, to generate the treatment scores, the user treatment engine samples from probability distributions for the set of treatments. The user treatment engine may use treatment selection parameters to sample a probability distribution for a treatment to generate the treatment score for the treatment. For example, the treatment selection parameters for a treatment may include a mean and standard deviation for a normal distribution, and the user treatment engine may sample the normal distribution to generate a treatment score for the treatment. The user treatment engine may adjust the treatment score for a treatment based on the user data or the treatment cost prediction for the treatment. For example, the user treatment engine may scale down the treatment score if the treatment cost prediction suggests a great cost to the online concierge system for applying the treatment to the user. The user treatment engine selects 540 a treatment from the set of treatments to apply to the user based on the generated treatment scores. The user treatment engine may select the treatment based on which treatment has the highest treatment score. Alternatively, the user treatment engine may rank the treatments based on their treatment scores and select the treatment based on where the treatment is in the ranking.

The user treatment engine applies 550 the selected treatment to the user. For example, the user treatment engine may transmit instructions to a user device associated with the user for the user device to display certain user interface elements that allow the user to interact with the online concierge system. The user treatment engine determines 560 a reward to the online concierge system for the application of the treatment to the user. For example, the user treatment engine may determine an increase in user interactions with the online concierge system based on the applied treatment. The user treatment engine may determine the benefit to the online concierge system of the increased user interactions (e.g., monetary benefits), and thereby determine the reward of the treatment. The user treatment engine may determine the reward based on treatment application data describing the application of the treatment to the user. The user treatment engine updates 570 the treatment selection parameters for the applied treatment based on the determined reward. Where the treatment selection parameters are used as parameters of a probability distribution, the user treatment engine may use the determined reward as a new sample to update the parameters of the probability distribution. For example, the user treatment engine may recompute parameters of the probability distribution based on a set of samples that includes the new sample, and use the recomputed parameters as the updated treatment selections parameters.

Other Considerations

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The weights may be stored on one or more computer-readable media, and are used by a system when applying the machine learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method for training a treatment selection model comprising:
at a computer system comprising a processor and a computer-readable medium:
accessing user data describing characteristics of a user of an online system;
accessing a set of treatments to apply to the user, wherein an actual negative consequence of applying each treatment of the set of treatments is uncertain when the treatment is applied to the user;
generating a consequence score for each treatment of the set of treatments by applying a negative consequence prediction model to the user data and the set of treatments, wherein generating the consequence score for each treatment of the set of treatments comprises determining a prediction of the actual negative consequence of applying the treatment to the user to be incurred at a time after applying the treatment to the user, and wherein applying the negative consequence prediction model comprises applying a machine learning model trained to predict negative consequences for treatments applied to a user;
generating a positive score for each treatment of the set of treatments by applying a multi-armed bandit algorithm to the set of treatments, wherein applying the multi-armed bandit algorithm comprises sampling from a probability distribution associated with each treatment of the set of treatments, wherein a positive score indicates an expected positive reward to the online system if an associated treatment is applied to the user, and wherein each probability distribution is sampled based on a set of treatment selection parameters associated with each treatment of the set of treatments;
adjusting each of the generated positive scores based on the generated consequence scores and the user data;
selecting a treatment of the set of treatments to apply to the user based on the adjusted positive scores;
applying the selected treatment to the user;
receiving treatment application data describing the application of the selected treatment to the user;
determining an actual positive reward to the online system based on the treatment application data, wherein the actual positive reward comprises a benefit received by the online system;
generating a training example for training the treatment selection model, wherein the treatment selection model is a neural network trained to select treatments, and wherein the training example comprises the applied selected treatment, the treatment application data, and a label based on the actual positive reward; and
training the treatment selection model to select treatments based on the training example.

2. The method of claim 1, wherein training the treatment selection model to select treatments based on the training example comprises:
updating the treatment selection parameters for the selected treatment based on the actual positive reward and the adjusted positive score of the selected treatment.

3. The method of claim 1, wherein the selected treatment is associated with an encouraged interaction, the treatment application data further describes a performance of the encouraged interaction by the user, and the encouraged interaction is an interaction targeted by the application of the selected treatment.

4. The method of claim 1, wherein the negative consequence prediction model comprises a set of machine learning models, and wherein each machine learning model in the set of machine learning models is trained to predict negative consequences for a corresponding treatment in the set of treatments.

5. The method of claim 1, wherein applying the multi-armed bandit algorithm comprises applying Thompson sampling to the user data and the consequence score for each treatment in the set of treatments.

6. The method of claim 1, wherein accessing the user data describing the characteristics of the user of the online system comprises accessing user data describing characteristics of a customer, a picker, or a runner.

7. The method of claim 1, wherein applying the selected treatment to the user comprises transmitting instructions to a client device of the user to display the selected treatment to the user.

8. The method of claim 1, wherein each treatment in the set of treatments comprises a set of treatment parameters.

9. The method of claim 1, wherein the probability distribution associated with each treatment of the set of treatments comprises at least one of a normal distribution or a beta distribution.

10. A non-transitory, computer-readable medium storing instructions that, when executed by a processor, cause the processor to:
   access user data describing characteristics of a user of an online concierge system;
   access a set of treatments to apply to the user, wherein an actual negative consequence of applying each treatment of the set of treatments is uncertain when the treatment is applied to the user;
   generate a consequence score for each treatment of the set of treatments by applying a negative consequence prediction model to the user data and the set of treatments, wherein generating the consequence score for each treatment of the set of treatments comprises determining a prediction of the actual negative consequence of applying the treatment to the user to be incurred at a time after applying the treatment to the user, and wherein applying the negative consequence prediction model comprises applying a machine learning model trained to predict negative consequences for treatments applied to a user;
   generate a positive score for each treatment of the set of treatments by applying a multi-armed bandit algorithm to the set of treatments, wherein applying the multi-armed bandit algorithm comprises sampling from a probability distribution associated with each treatment of the set of treatments, wherein a positive score indicates an expected positive reward to the online system if an associated treatment is applied to the user, and wherein each probability distribution is sampled based on a set of treatment selection parameters associated with each treatment of the set of treatments;
   adjust each of the generated positive scores based on the generated consequence scores and the user data;
   select a treatment of the set of treatments to apply to the user based on the adjusted positive scores;
   apply the selected treatment to the user;
   receive treatment application data describing the application of the selected treatment to the user;
   determine an actual positive reward to the online system based on the treatment application data, wherein the actual positive reward comprises a benefit received by the online system;
   generate a training example for training a treatment selection model, wherein the treatment selection model is a neural network trained to select treatments, and wherein the training example comprises the applied selected treatment, the treatment application data, and a label based on the actual positive reward; and
   train the treatment selection model to select treatments based on the training example.

11. The computer-readable medium of claim 10, wherein the instructions that cause the processor to train the treatment selection model to select treatments based on the training example comprise instructions to:
   update the treatment selection parameters for the selected treatment based on the actual positive reward and the adjusted positive score of the selected treatment.

12. The computer-readable medium of claim 10, wherein the selected treatment is associated with an encouraged interaction, the treatment application data further describes a performance of the encouraged interaction by the user, and the encouraged interaction is an interaction targeted by the application of the selected treatment.

13. The computer-readable medium of claim 10, wherein the negative consequence prediction model comprises a set of machine learning models, and wherein each machine learning model in the set of machine learning models is trained to predict negative consequences for a corresponding treatment in the set of treatments.

14. The computer-readable medium of claim 10, wherein the instructions for applying the multi-armed bandit algorithm comprises instructions that cause the processor to apply Thompson sampling to the user data and the consequence score for each treatment in the set of treatments.

15. The computer-readable medium of claim 10, wherein the instructions for accessing the user data describing the characteristics of the user of the online system comprise instructions that cause the processor to access user data describing characteristics of a customer, a picker, or a runner.

16. The computer-readable medium of claim 10, wherein the instructions for applying the selected treatment to the user further cause the processor to transmit instructions to a client device of the user to display the selected treatment to the user.

17. The computer-readable medium of claim 10, wherein each treatment in the set of treatments comprises a set of treatment parameters.

18. The computer-readable medium of claim 10, wherein the probability distribution associated with each treatment of the set of treatments comprises at least one of a normal distribution or a beta distribution.

19. A system comprising:
   a processor; and
   a non-transitory, computer-readable medium storing instructions that, when executed by a processor, cause the processor to:
      access user data describing characteristics of a user of an online concierge system;
      access a set of treatments to apply to the user, wherein an actual negative consequence of applying each treatment of the set of treatments is uncertain when the treatment is applied to the user;
      generate a consequence score for each treatment of the set of treatments by applying a negative consequence prediction model to the user data and the set of treatments, wherein generating the consequence score for each treatment of the set of treatments comprises determining a prediction of the actual negative consequence of applying the treatment to the user to be incurred at a time after applying the treatment to the user, and wherein applying the negative consequence prediction model comprises applying a machine learning model trained to predict negative consequences for treatments applied to a user;
      generate a positive score for each treatment of the set of treatments by applying a multi-armed bandit algorithm to the set of treatments, wherein applying the multi-armed bandit algorithm comprises sampling from a probability distribution associated with each treatment of the set of treatments, wherein a positive score indicates an expected positive reward to the online system if an associated treatment is applied to the user, and wherein each probability distribution is sampled based on a set of treatment selection parameters associated with each treatment of the set of treatments;

adjust each of the generated positive scores based on the generated consequence scores and the user data;

select a treatment of the set of treatments to apply to the user based on the adjusted positive scores;

apply the selected treatment to the user;

receive treatment application data describing the application of the selected treatment to the user;

determine an actual positive reward to the online system based on the treatment application data, wherein the actual positive reward comprises a benefit received by the online system;

generate a training example for training a treatment selection model, wherein the treatment selection model is a neural network trained to select treatments, and wherein the training example comprises the applied selected treatment, the treatment application data, and a label based on the actual positive reward; and train the treatment selection model to select treatments based on the training example.

20. The system of claim 19, wherein the probability distribution associated with each treatment of the set of treatments comprises at least one of a normal distribution or a beta distribution.

* * * * *